United States Patent
Xie et al.

(10) Patent No.: US 8,323,510 B2
(45) Date of Patent: Dec. 4, 2012

(54) ULTRASOUND ASSISTED HEAVY METAL RECOVERY

(76) Inventors: Fengchun Xie, Guangzhou (CN); Yang Ma, Irvine, CA (US)

(*) Notice: Subject to any disclaimer, the term of this patent is extended or adjusted under 35 U.S.C. 154(b) by 879 days.

(21) Appl. No.: 12/388,948

(22) Filed: Feb. 19, 2009

(65) Prior Publication Data
US 2009/0250408 A1    Oct. 8, 2009

Related U.S. Application Data

(60) Provisional application No. 61/041,863, filed on Apr. 2, 2008.

(51) Int. Cl.
*C02F 11/00* (2006.01)

(52) U.S. Cl. ............... 210/748.05; 210/790; 210/748.01; 210/912; 210/724; 422/20; 422/186; 423/24; 423/36; 423/43; 423/45; 75/724; 75/725; 75/726; 266/170

(58) Field of Classification Search .................. 210/912, 210/702, 719, 724, 737, 748.01–748.05, 210/500.1, 511, 383, 198.1, 790; 422/20, 422/186; 423/24, 34–68; 75/724–726; 266/170
See application file for complete search history.

(56) References Cited

U.S. PATENT DOCUMENTS

| | | | |
|---|---|---|---|
| 4,362,629 A * | 12/1982 | Senda et al. | 210/714 |
| 5,002,645 A * | 3/1991 | Eastland et al. | 204/157.42 |
| 5,059,403 A * | 10/1991 | Chen | 423/24 |
| 5,993,668 A * | 11/1999 | Duan | 210/713 |
| 2004/0101457 A1* | 5/2004 | Pahlman et al. | 423/50 |

FOREIGN PATENT DOCUMENTS

JP    2008188479 A  *  8/2008

OTHER PUBLICATIONS

Konno, Akihisa et al.,"On the Collapsing Behavior of Cavitation Bubble Clusters", JSME International Journal, Series B, vol. 45, No. 3, 2002, pp. 631-637.

* cited by examiner

*Primary Examiner* — Joseph Drodge
*Assistant Examiner* — Cameron J Allen
(74) *Attorney, Agent, or Firm* — Jie Tan (57) ABSTRACT

Methods and systems for heavy metal separation and recovery from heavy metal-containing sludge or wastes. The method utilizes ultrasonic treatment assisted acid leaching process to separate and recover different heavy metals from multi metals-containing sludge. The technique can be cost effectively implemented for heavy metal separation and purification processes in the real world at industrial scales.

20 Claims, 4 Drawing Sheets

ULTRASOUND ASSISTED HEAVY METAL RECOVERY

CROSS-REFERENCE

Priority is claimed from U.S. Provisional Application 61/041,863, filed on Apr. 2, 2008, which is hereby incorporated by reference.

BACKGROUND

The present application relates to heavy metal separation and recovery from a metal-containing mixture, and more particularly to extracting different heavy metals distinctively and efficiently from a slurry or sludge containing a complex metal mixture by an ultrasound-assisted leaching separation.

BRIEF DESCRIPTION OF THE DRAWINGS

The disclosed inventions will be described with reference to the accompanying drawings, which show important sample embodiments of the invention.

DETAILED DESCRIPTION OF SAMPLE EMBODIMENTS

Note that the points discussed below may reflect the hindsight gained from the disclosed inventions, and are not necessarily admitted to be prior art.

Much of industrial waste is often metal-containing sludge, disposed by a broad range of industrial applications such as nuclear industry, printed circuit board manufacturing, metal plating, and painting etc. Even some municipal waste sludge sometimes contains an unacceptable level of metal content. The metals in a metal-containing waste usually are a settled mixture of solid states of different metal hydroxides or carbonates and other solids as well. While heavy metals in waste sludge are hazardous to public health and the natural environment, heavy metals are also reusable and valuable. Without processing of disposed metal containing waste, serious hazards to the environment may be caused, and at the same time, valuable scarce resources are wasted.

The treatments for environmental protection and resources recovery from heavy metal-containing sludge currently include primarily two processes: thermal treatment, also known as pyrometallurgical treatment, and wet process also known as hydrometallurgical treatment.

The thermal treatment process usually includes drying, calcining, roasting, smelting and refining, are some of these stages. Because it requires heating and drying, the thermal treatment process often releases metallurgical dusts or fumes, causing secondary pollution to the environment. Moreover, the thermal treatment process has difficulty in achieving high metal recovery rates due to its inefficiency in separating among impurities of multiple metals.

The wet process usually first uses acidic (or ammonia, alkali) solution to fully dissolve (acidify) metal-containing sludge into a solution, then applies ammonia leaching or staged precipitation or solvent extraction for metals separation and purification. However, due to its multi-stepped, complicated chemical treatment nature, this process is prone to produce secondary pollution as well. Often, in order to achieve an acceptable level of heavy metal separation and recovery, the cost of manipulation can be unacceptable.

The present application discloses new methods and processes to separate and recover individual heavy metal components from a metal-containing sludge or waste mixture.

This disclosure will, in part, be hereinafter described with reference to heavy metal separation and recovery from metal containing slurry or sludge. However, it is to be appreciated that the application is not limited to this type of use. When the term "metal-containing mixture" is used in the present specification it is intended to include any metal-containing compounds including both liquid forms, such as various mixed metal solutions, and solid forms, such as metal-containing slurry and sludge, etc.

The present application utilizes an ultrasonic power assisted leaching process to activate heavy metal molecular surface, and intensify heavy metal acidifying process, and reduce colloidal particle settling time. During the leaching process, the ultrasonic wave speeds up particle interactions and promotes their aggregation, and inhibits the adsorption between solid and liquid particles.

In one embodiment, a sludge or waste mixture is divided into two parts: one part is treated with sufficient acid to form a diluted acid solution which dissolves most of the heavy metal compounds in the sludge, while the other apart is fully mixed with water to form a complete slurry in which metal solid particles are fully dispensed within water.

In one embodiment, the prepared slurry part is then slowly added into the acidified part intermittently while applying ultrasonic power to create acidic selective leaching. As each different metal hydroxide or carbonate has its own distinctive solubility, and different metals dissolve into leaching solution with different pH values, with the assistance of an ultrasonic wave. At a specific end pH, specific heavy metals are selectively and efficiently extracted into the aqueous phase.

In one embodiment, the precipitation at a higher pH is further dissolved at a lower pH, the later extract and precipitation are further separated and used for more metal recovery.

The disclosed innovations, in various embodiments, provide one or more of at least the following advantages. However, not all of these advantages result from every one of the innovations disclosed, and this list of advantages does not limit the various claimed inventions:

Low cost and simple reliable, industrial applicable process;
low secondary pollution;
high efficiency.

The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The present disclosure provides a cost effective process that combines acid leaching with the assistance of ultrasonic treatment, separating different heavy metal components from metal-containing solid mixture by using different end pH. The process is therefore a low cost, simple, reliable industrial level procedure, and has no secondary pollution. It is especially useful for metal recovery and resource reuse from heavy metal-containing industrial sludge or waste mixture.

The difficult part for heavy metal recovery from a sludge or waste mixture is to separate different metal components cost effectively. It may be especially difficult to separate relatively completely the major metals that contribute the large portions of the metal mixture from the remaining mixture.

Theoretically, heavy metals can be separated based upon their solubility at different pH to a leaching solution via pH adjustment. However, the dissolution process is a reversible process where metal molecules in solid compounds and metal molecules in liquid constantly interchange in equilibrium. Different metal molecules have different equilibrium constants for ions migrating from the crystal surface of a compound in the solid state into water and its ions in solution. The solubility of a metal compound at equilibrium can be presented by its solubility product constant in a solution. The bigger the solubility product constant, the more soluble the metal compound in the solution.

As the ionic concentration of a dissolved metal is affected by the pH of the solution, different metal compounds of different solubility product constants are affected differently by pH. Higher solubility constant is affected less while lower solubility constant is significantly affected by pH. For instance, during acidic leaching, metals with highest solubility product constant can still almost completely dissolve into solution under higher pH, i.e. weak acidic condition while other metals of lower solubility product constants remain undissolved or even precipitate into solid state. By incrementally increasing acidic concentration, i.e. reducing pH, the metals of differential solubility product constants can dissolve into solution in a controlled order in accordance to their solubility product constants. Therefore, different metals can be separated and recovered based upon their solubility product constants in a solution via pH manipulation.

In practice, however, heavy metal separation and recovery by leaching heavy metal-containing sludge via pH manipulation is difficult to be carried out efficiently. First heavy metal compounds cannot reach their dissolution equilibrium in the leaching solution in a short time, in another word, soluble metal compounds cannot reach their end points of dissolution and insoluble metal compounds cannot reach their end points of precipitation within a reasonably efficient time. The inefficiency in dissolution of soluble metal compounds is caused mostly by the slow solid-liquid diffusion process. This diffusion process can be blocked by insoluble metal components deposited on the surface as metal crystal. As a result, in a sludge or waste mixture of many different metal solids, the heavy metals with higher solubility product constant cannot fully dissolve into their leaching solution without over dosing the leaching agent.

Secondly, even with good mixing dosing of a leaching liquid, the leaching liquid often generates temporary local high ion concentration spots, for example, concentrated acidic spots. In the concentrated acidic spots, localized dissolution of the metal with lower solubility product constant may occur. When these local high concentration spots disappear, dissolved metals of lower solubility product constant will become insoluble again and precipitate and aggregate into micro crystals or surface charged colloidal particles that stay in suspension and do not easily settle or separate from the liquid phase. Therefore, for real world industrial application, leaching process for the separation and recovery of different heavy metals within the metal-containing sludge via pH manipulation has not been very efficient, and can not be easily used in practice.

Ultrasound assisted leaching, however, overcomes the above described problems. The main mechanism of ultrasound-assisted leaching separation is based on ultrasound induced fluid cavitations. When applying ultrasonic waves to a solid-liquid mixture, acoustic cavitation occurs. However its low pressure cavitation bubbles in a liquid soon begin to collapse due to the higher pressure of the surrounding medium. When the bubbles collapse, they produce high speed local jet-streams that could reach velocities over 100 meters per second. See Konno A, Kato H, Yamaguchi H, Maeda M., 2002,"on the collapsing behavior of cavitation bubble clusters," J. JSME International Series B-Fluids Thermal Engineering, 45(3), page 631.

Within the ultrasound applied slurry, surfaces of solid particles are pounded by such high speed jet-streams generated from burstings of fluid cavitation bubbles. These high speed jet-streams produce activated solid surfaces that increase the movement of ions at the surface of higher solubility heavy metal into liquid phase, intensify cross reactions between solid and liquid phases, and therefore speed up solid-liquid phase diffusion processes. As a result, ultrasonic agitation significantly enhances both the reaction rate and the diffusion rate of the solid-liquid leaching process.

On the other hand, ultrasonic waves of certain strength rates and frequencies are capable of intensifying colloidal solid particle aggregation by agitating surrounding fluid and reducing surface charges of colloidal particles, significantly accelerating sedimentation and precipitation of extremely fine and small particles. These effects work to greatly enhance the extraction of soluble metal and the separation of insoluble solid remains of a slurry, dramatically reduce the time required by metal compounds of waste sludge to reach its dissolution equilibrium (or its capability of dissolution) in the leaching solution, making separation of heavy metals based only on their dissolution abilities to the leaching solution industrially efficient and applicable.

In a preferred example embodiment, a waste print circuit board sludge that consists of mainly copper and ferric hydroxide is acidic leached with ultrasonic assistance, acidic leaching solution is controlled with an end pH of approximately 3. Under this condition, most of the copper compound will dissolve into liquid, whereas most of the ferric particles will remain as solids. This way, copper and ferric compounds can be very cost efficiently separated and no secondary environment pollution.

Figure 1:
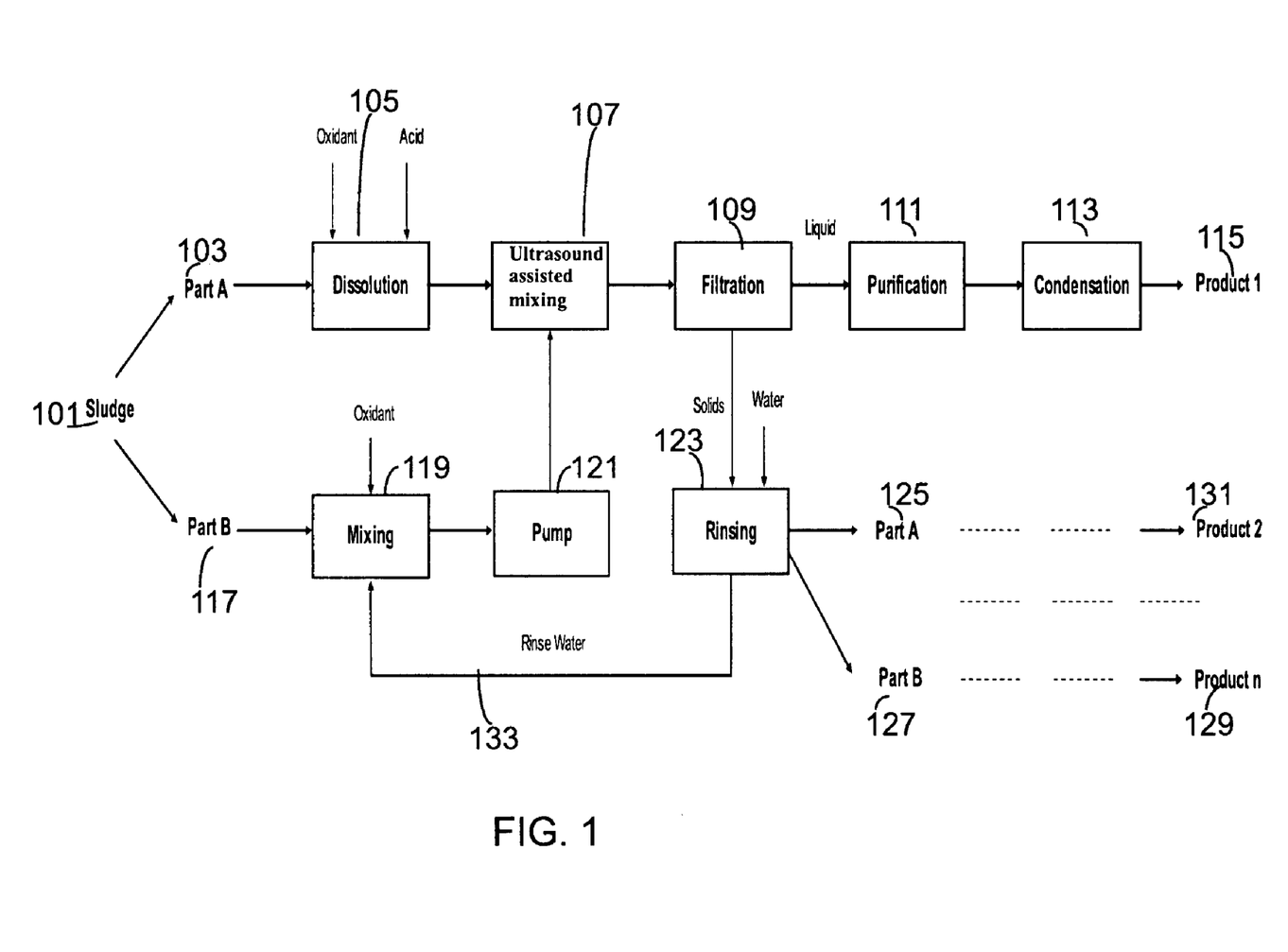
FIG. 1 is a flow diagram for the general heavy metal separation process of a metal-containing sludge in accordance to this disclosure.

FIG. 1 describes a general industrial applicable ultrasonic power assisted heavy metal recovery procedure. Sludge 101 is divided into two portions, part A 103, and part B 117. Generally the metal content of sludge 101 is tested before-hand, or is a known factor before the processing. The weight ratio of dividing between part A and part B is determined by the metal content contained in the sludge. Generally the weight ratio between part A and part B is in the range of 0.1 to 10. The ratio is empirically adjusted by the conditions of a particular setting of the process, and by the required end pH value for separation of a particular group of metals.

Part A 103 is completely mixed with an acid solution at step 105, such as sulfuric acid or hydrogen chloride acid, to a pH that completely dissolves all metal solids; and if necessary, such as when the sludge contains ferrous compound, oxidant agent(s), such as hydrogen peroxide, is added to convert one form of metal compound into a more stable metal compound form, such as ferric compound. At the same time, part B 117 is completely mixed with water at step 119 to bring the sludge into fully mixed slurry. The amount of water may be decided by the content of metals in the sludge and can reach as high as 90%. If necessary, such as if the sludge contains ferrous compound, oxidant is added to convert the ferrous compound into a ferric compound. Alternatively, air is blown into the slurry during mixing to convert ferrous compound into ferric compound. At the mixing step 119, the mixture is vigorously stirred for a sufficient period of time, depending on the amount of part B, usually 0.5-1 hour, completely mixing water with the sludge. The water may come from the rinsing steps of the later step as shown in step 133.

At step 121, slurry of step 119 is slowly pumped into and mixed with acidified solution of step 105. Shown in step 107, an ultrasonic power of sufficient strength and frequency is applied simultaneously to the mixing to accelerate the process of mixing and help reaching equilibrium of solubility in a reasonable time. The first pH in the process is set to be around the Ksp of the easiest leaching heavy metal which has the highest solubility. For example, nickel hydrate can be leached into the solution in a high pH solution while other metal hydrates, e.g. iron, copper, or chromium precipitate and remain in solid status.

The mixture of solids and liquid of settled sludge are subsequently fed into a sludge dewatering system at step 109. The example dewatering can be done by a plate presser. The produced filtrate or concentrate, which should only contain the most easily acidic leached metal, such as nickel, and some minimum impurities which can be further purified and condensed through steps 111 and 113 to produce product 115. The example purification processes, depending on the particular metals in the extract, may include solvent extraction, adsorption, precipitation, ion exchange, and/or re-crystallization.

The precipitated solid of step 109 is rinsed with water at step 123, the resulted rinsing water may be used for step 119 for slurry preparation for part B at step 133. The rinsed solid is then further divided into two portions, portion A 125 and portion B 127. The process of steps as described above can be repeated with a leaching end pH being set to the Ksp of the new easiest heavy metal in the solids of step 123, for example, the Ksp of a copper hydrate. While the new easiest soluble metal is leached into the acidic solution and being purified into final product 131, other heavy metals, for example, iron, and chromium still precipitate and are separated into solid 129.

The above process can be repeated until all the metals contained in the solid phase are separated and recovered.

During the process, an alkaline or oxidant, including oxygen or air or hydrogen peroxide solution, can also be added into the heavy metal-containing sludge with the assistance of ultrasonic waves. Maintaining at a preset pH, alkalinity dissolved metal components, for example, Cr, can enter into solution; whereas alkalinity less dissolved metal components still remain in the solid phase.

With the easiness of manipulation of pH, the present application is superior to the existing techniques with obvious advantages: lower cost, higher process efficiency, much better recovery rate, simpler and more reliable, and zero discharge and no secondary pollution.

The foregoing is an example of a general process and shall not be constructed to limit the scope of the claims. The processes and operations disclosed herein may be implemented in a number of ways, and such changes and modifications may be made by a person skilled in the art without further undue experiments.

EXAMPLES

The present invention is further illustrated by the following several examples to demonstrate the exact steps that may be taken. The exact conditions and steps for a particular metal containing sludge can be determined by a person skilled in the art with common knowledge of the field in accordance with the principles and mechanisms described in this disclosure. It is contemplated and intended that the invention is not limited to these examples.

Example 1

Figure 2:
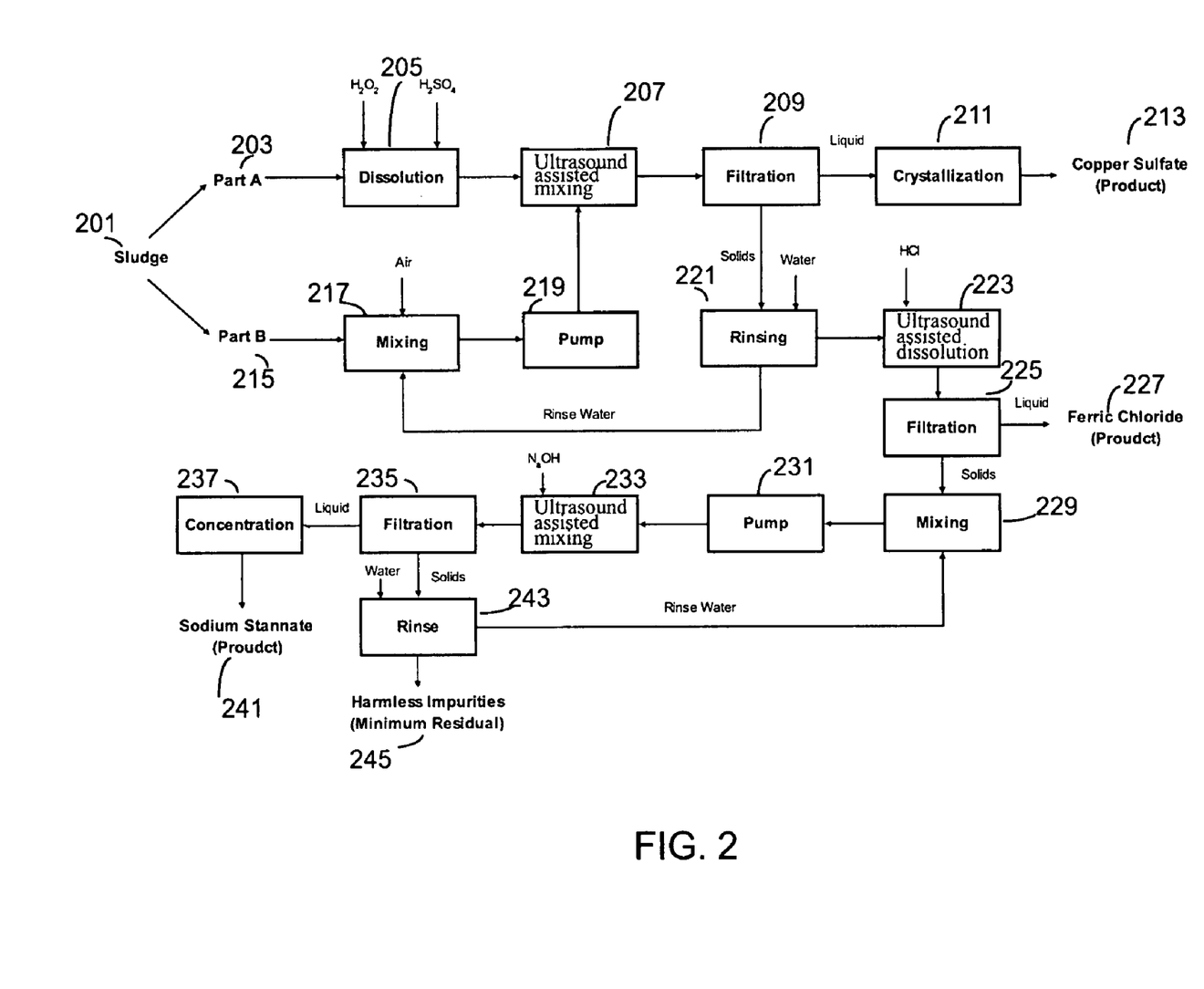
FIG. 2 is a flow diagram for an exemplary heavy metal separation process of a sludge containing copper, iron, and tin in accordance to this disclosure.

FIG. 2 demonstrates a metal recovery process from the waste sludge from a printed circuit board manufacturing facility that contains 4% of copper, 5% of iron, 1% of tin, and 70% of water.

Sludge 201 is first divided into two parts, part A 203 into Tank A and part B 215 into Tank B based on a weight ratio of 1 to 2.2. Part A 203 is then completely mixed with a sulfuric acid solution in Tank A with a controlled end pH of approximately 1.5 at step 205, and the product of the acidification is indicated as A1 in Tank A. A 27% hydrogen peroxide solution is added into the A1 of Tank A and oxidizes ferrous compound in A1 into ferric compound.

At the same time, part B 215 is completely mixed with water at step 217 to bring the sludge into fully mixed slurry. The water may be the rinse water produced in Step 221. The final water content of step 217 may comprise up to 90% by weight. After completely stir mixing for about one hour, step 217 slurry is pumped into another tank at step 219 and this fully mixed slurry is referred as B1. Air may then be blown into B1 slurry while vigorously stir mixing it to oxidize ferrous compound of B1 slurry to ferric compound.

At step 207, step 219 B1 slurry is slowly added into the acidified A1 sludge with mechanical mixing and simultaneously ultrasonic treatment with a frequency of 20 kHz and an intensity of 25 kw/m3. The mixing may be maintained for two to three hours to reach an end pH of approximately 3. At the end pH of approximately 3 most of the copper compound in the sludge is leached into leaching solution, whereas most of the iron compound and the tin compound are precipitated and can be settled on the bottom of the tank as sludge.

The sludge of step 207 is subsequently fed into a plate presser for solid and liquid separation at step 209. The produced filtrate which contains mostly copper and very little impurities can be concentrated to produce the raw copper sulfate crystal and subsequent re-crystallization of it through step 211 to produce an industrial useful fine copper sulfate crystal product 213.

The dewatered sludge of step 209 is rinsed one or more times with water at step 221, and the rinse water may be used for slurry preparation in step 217.

The rinsed sludge is then mixed slowly with 30% hydrochloric acid at step 223 with vigorous stirring and simultaneously ultrasonic treatment with a frequency of 20 kHz and an intensity of 15 kw/m3. The mixing may be maintained for about one hour to reach an end pH of approximately 1. At the end pH of approximately 1, most of the iron compound in the sludge is leached into leaching solution, whereas almost all of the tin compound still remains in the solid.

The sludge of step 223 is then fed into a plate presser for solid and liquid separation at step 225. The produced filtrate contains mostly ferric chloride solution 227 which may be recycled back to the printed circuit board manufacturing facility and be used as a coagulant for wastewater treatment.

At step 229, the dewatered solid of step 225 is then added with water or rinse water produced in step 243. The water content may be up to 90% by weight. After completely stir mixing for about one hour, the formed slurry is pumped into another vessel at step 231 and the fully mixed slurry is referred as S1.

At step 233, about 30% sodium hydroxide solution is slowly added into sludge S1 with vigorous stirring and simultaneous ultrasonic treatment of a frequency of 20 kHz and an intensity of 25 kw/m3. The mixing may be maintained for about three hours to reach an end pH of approximately 13. At the end pH of 13, most of the tin compound within the sludge is leached into the leaching solution. Other harmless impurities remains in the solid.

At step 235, the settled sludge produced in step 233 is fed into a plate presser for solid and liquid separation. The produced liquid filtrate is then concentrated at step 237 to produce a sodium stannate product 241 which can be further used for industrial applications. At step 243, the dewatered sludge generated from step 235 may be rinsed with water and the rinse water may be used in the slurry preparation in step 229.

Example 2

Figure 3:
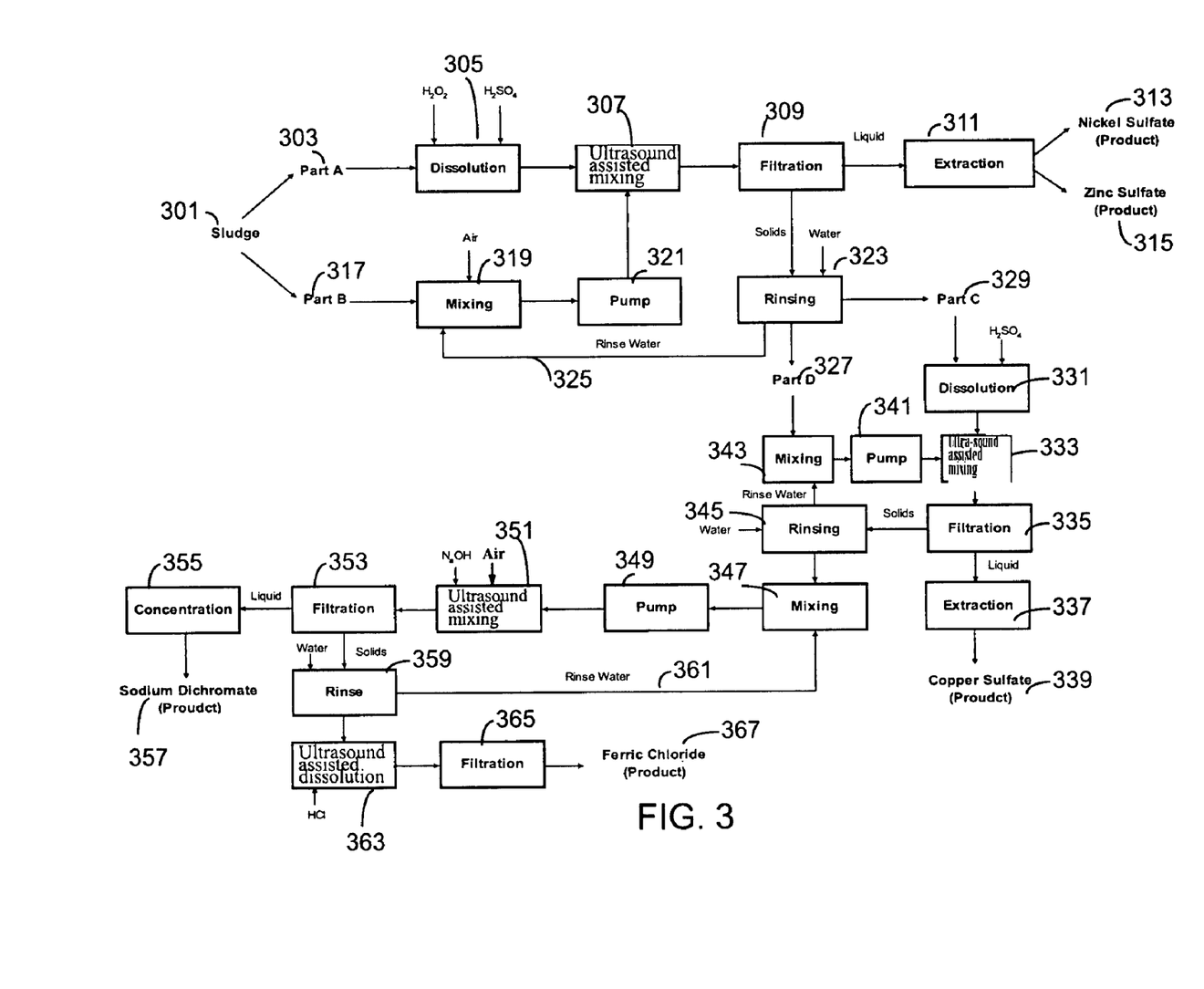
FIG. 3 is a flow diagram for an exemplary heavy metal separation process of a sludge containing nickel, copper, iron, zinc, and chromium in accordance to this disclosure.

Referring to FIG. 3, the waste sludge from a metal plating plant facility contains 2% of nickel, 1.5% of copper, 2.5% of iron, 1.4% of zinc, 3% of chromium, and 60% of water. The treatment process of the metal recovery from the waste sludge was carried out as the following:

Sludge 301 is first divided into two parts, part A 303 into Tank A and part B 317 into Tank B with weight ratio of 1 to 3.2. Part A 303 is completely mixed with a sulfuric acid solution in Tank A to reach a controlled end pH of approximately 1.5 at step 305, and the product of the acidification is indicated as A1 in Tank A. A 27% hydrogen peroxide solution is then added into the A1 of Tank A and oxidizes ferrous compound in A1 into ferric compound.

At the same time, part B 317 is completely mixed with water at step 319 to bring the sludge into fully mixed slurry. The water may be rinse water produced in Step 323 and the water content may be up to 90% by weight. After completely stir mixing for about one hour, slurry 319 is pumped into another tank at step 321 and this fully mixed slurry is referred as B1. Then air may be blown into the B1 slurry with vigorously stirring to oxidize ferrous compound in B1 slurry into ferric compound.

At step 307, slurry B1 is slowly added into the acidified sludge A1 with mechanical mixing and simultaneous ultrasonic treatment with a proximate frequency of 20 kHz and an intensity of 25 kw/m3 from an ultrasound generator to reach an end pH of approximately 4. At the end pH of about 4, most of the nickel and zinc compound in the sludge is leached into the leaching solution, whereas most of the copper and iron (ferric) and chromium (trivalent) compound are precipitated and settled to the bottom of the tank as sludge.

At step 309, the step 307 settled sludge is subsequently fed into a plate presser for solid and liquid separation. The produced filtrate contains mostly nickel and zinc compound and very little impurities. The filtrate may be purified by solvent extraction at step 311 to produce respectively industrial usable nickel sulfate product 313 and zinc sulfate product 315.

The dewatered sludge produced in step 309 is rinsed with water at step 323, and the rinse water 325 may be used in slurry preparation in step 319.

The rinsed sludge from step 323 is further divided into two parts, part C 327 in Tank C and part D 329 in Tank D based on a weight ratio of 1 to 6.6. At step 331 sulfuric acid is then dosed into Part C sludge with mechanical mixing to reach a controlled end pH of approximately 1.5, producing acidified sludge C1 in Tank C.

At the same time, water or rinse water produced in step 345 is added into Part D sludge at step 343. The water content may comprise up to 90% by weight. After vigorous stirring for about one hour, the formed Part D slurry is pumped into another tank at step 341 and this fully mixed slurry is referred to as D1.

At step 333, D1 slurry is then slowly added into C1 sludge with mechanical mixing and simultaneous ultrasonic treatment of a proximate frequency of 20 kHz and an intensity of 25 kw/m3. The mixing may be maintained for two to three hours to reach an end pH of approximately 3. At the end pH of 3, most of the copper compound in the sludge is leached into the leaching solution, whereas most of the iron (ferric) and the chromium (trivalent) compound are precipitated and settled to the bottom of the tank.

At step 335, the settled sludge of step 307 is subsequently fed into a plate presser for solid and liquid separation. The produced filtrate contains mostly copper compound and very little impurities. The filtrate is then purified by solvent extraction at step 337, an industrial usable copper sulfate crystal product 339 may be produced.

The dewatered sludge produced in step 335 may be rinsed with water at step 345, and rinse water may be used in slurry preparation in step 343.

At step 347, water or rinse water produced in step 359 is added into the rinsed sludge of step 345, and the water content may reach up to 90% by weight. After stir-mixing for about one hour, the formed slurry is pumped into another tank at step 349. At step 351 a 30% sodium hydroxide solution is slowly added into this slurry with assistance of aeration, mechanical stirring and simultaneous ultrasonic treatment with a frequency of 20 kHz and an intensity of 25 kw/m3 from an ultrasound generator. This mixing may be maintained for about two hours to reach an end pH of approximately 13. Since most of the trivalent chromium compounds are converted to hexavalent chromium and at the end pH 13, they are dissolved into solution and are leached into leaching solution. Most of the iron compounds remain in solid state.

At step 353, the settled sludge of step 351 is fed into a plate presser for further solid and liquid separation. The produced filtrate is concentrated at step 355, producing industrial useful sodium dichromate.

At step 359, the dewatered sludge generated from step 353 may be rinsed with water and the generated rinse water 361 may be used for slurry preparation in step 347.

At step 363, a 30% hydrochloric acid solution is added into the rinsed sludge of step 359 with vigorous stirring and simultaneous ultrasonic treatment with a frequency of 20 kHz and an intensity of 15 kw/m3. The mixing may be maintained for about one hour to reach an end pH of approximately 1. At the end pH approximately 1, most of the iron compounds are leached into the leaching solution. Remaining in the solid are other harmless impurities in a minimum volume.

At step 365, the settled sludge of step 363 is fed into a plate presser for solid and liquid separation. The produced filtrate is ferric chloride solution 367, which after simple processing to convert the trace hexavalent chromium to trivalent chromium, can be recycled back to the metal plating facility used as a coagulant for on site wastewater treatment.

Example 3

Figure 4:
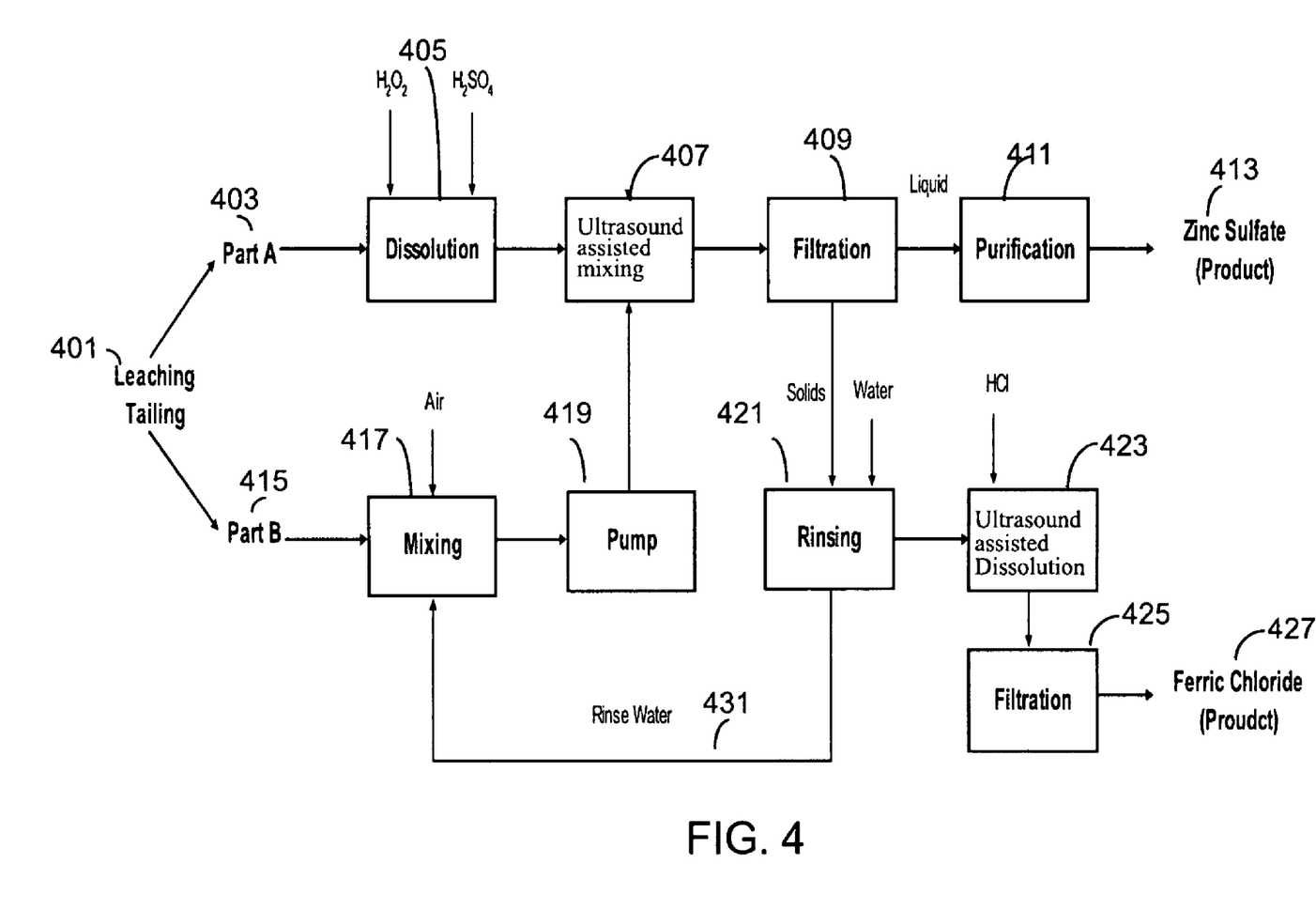
FIG. 4 is a flow diagram for an exemplary heavy metal separation process of a sludge containing zinc and iron in accordance to this disclosure.

Referring to FIG. 4, the example process is about the treatment process for the leaching tailing waste sludge from a zinc-refine plant containing 11% of zinc, 16% of iron, 40% of water.

Sludge 401 is divided into two parts, part A 403 into Tank A and part B 415 into Tank B based on a weight ratio of 1 to 2.6. With vigorous mechanical mixing, at step 405, sulfuric acid is dosed into Part A sludge to reach a controlled end pH of approximately 1.5. The product of the acidification is indicated as A1 in Tank A. A 27% hydrogen peroxide solution is the added into the A1 of Tank A to oxidize ferrous compound in A1 to ferric compound.

At the same time, water or rinse water produced in Step 421 is added into Part B sludge at step 417, and the water content may reach up to 90% by weight. After vigorous stir-mixing for about one hour, the formed Part B slurry is pumped into another tank at step 419. During the vigorous stir-mixing of step 417, air may be also blown into this fully mixed slurry to oxidize ferrous compound of B1 slurry to ferric compound.

At step 407, B1 slurry of step 419 is slowly pumped into the acidified A1 sludge of step 405 with mechanical mixing and simultaneous ultrasonic treatment at a frequency of 20 kHz and an intensity of 25 kw/m3 from an ultrasound generator. The mixing may be maintained for two to three hours to reach an end pH of approximately 3.5. At the end pH of approximately 3.5, most of the zinc compound in the sludge is leached into the leaching solution, and most of the iron (ferric) are precipitated and settled to the bottom of the tank as sludge.

At step 409, the settled sludge of step 407 is subsequently fed into a plate presser for solid and liquid separation. The produced filtrate which contains mostly zinc compounds and very little impurities may be purified by sulfide precipitation and pH regulation to 4.5 at step 411. The zinc compound solution may then be concentrated to produce an industrial useful zinc sulfate product 413.

The dewatered sludge produced in step 409 may be rinsed by water at step 421, and the rinse water may be used in slurry preparation in step 417.

At step 423, a 30% hydrochloric acid solution is added into the rinsed sludge from step 421 with vigorous stirring and simultaneous ultrasonic treatment at a frequency of 20 kHz and an intensity of 15 kw/m3. The stir-mixing may be maintained for about one hour to reach an end pH of approximately 1. At pH of approximately 1, most of the iron compounds in the sludge are leached into the leaching solution, the remaining solid may be consisting mostly of other harmless impurities with a minimum volume.

The settled sludge is fed into a plate presser for further solid and liquid separation at step 425, and the produced filtrate may be mostly ferric chloride solution 427 that can be used as coagulant for waste water treatment after some simple processing.

According to various embodiments, there is provided: a method for recovering metal from sludge, comprising the actions of: a) dividing a sludge into a first part and a second part; b) mixing acid into said first part to a specified pH that sufficiently dissolves a concerned group of metals in the first part; c) mixing sufficient water into said second part and producing a sufficient slurry for said second part; d) slowly adding sufficient amount of said second part of step c) into sufficient amount of said first part of step b) to reach a specified end pH with simultaneous ultrasonic treatment of sufficient intensity and frequency, whereby the ultrasonic treatment enhances the interaction between the solid and the liquid phase of the metals; and e) separating the soluble phase from the solid precipitation of the mixture produced by step d).

According to various embodiments, there is provided: a method for recovering heavy metals from sludge, comprising the actions of: a) dividing a sludge into a first part and a second part in a weight ratio determined by metal contents of the sludge; b) mixing acid into said first part to a specified pH which sufficiently dissolves heavy metals in the first part, and if the sludge contains ferrous compound, adding sufficient amount of oxidant into the acidified first part whereby ferrous compound is converted into ferric compound; c) mixing water into said second part and producing a sufficient slurry for said second part, if the sludge contains ferrous compound, adding sufficient amount of oxidant into the slurry whereby ferrous compound is converted into ferric compound; d) slowly adding said second part into said first part of step b) and adjusting pH to reach a specified pH with a simultaneous ultrasonic treatment of sufficient intensity and frequency; e) separating the soluble phase from the solid precipitation of the mixture produced by step d); f) slowly adding acid into the solid phase of step e), adjusting pH to reach a specified pH and simultaneously applying ultrasonic wave with sufficient intensity and frequency; and g) separating the soluble phase from the solid precipitation of the mixture produced by step f).

According to various embodiments, there is provided: methods and systems for heavy metal separation and recovery from heavy metal-containing sludge or wastes. The method utilizes ultrasonic treatment assisted acid leaching process to separate and recover different heavy metals from multi metals-containing sludge. The technique can be cost effectively implemented for heavy metal separation and purification processes in the real world at industrial scales.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for recovering metal from waste-sludge, comprising the actions of:
   a) dividing a waste-sludge into a first part and a second part;
   b) mixing acid into said first part to a specified pH that sufficiently dissolves a concerned group of metals in the first part;
   c) mixing sufficient water into said second part and producing a sufficient slurry for said second part;
   d) slowly adding sufficient amount of said second part of step c) into sufficient amount of said first part of step b) to reach a specified end pH with simultaneous ultrasonic treatment of sufficient intensity and frequency, whereby the ultrasonic treatment enhances the interaction between the solid and the liquid phase of the metals; and
   e) separating the soluble phase from the solid precipitation of the mixture produced by step d).

2. The method of claim 1, wherein said action of step b) includes addition of hydrogen peroxide solution.

3. The method of claim 1, wherein the pH in the action of step b) is under 1.5.

4. The method of claim 1, wherein the pH in the action of step b) is above 1.

5. The method of claim 1, wherein the final pH in the action of step d) is a pH for dissolution of a specific metal but still keeps other metals undissolved.

6. The method of claim 1, wherein the intensity of the ultrasonic treatment in step d) is about 10-100 kw/m$^3$, and the frequency is about 20-100 kHz.

7. The method of claim 1, further includes repeating steps a) to e) with the solid phase of step e).

8. The method of claim 1, wherein the acid in step b) is replaced with alkaline.

9. The method of claim 1, wherein the weight ratio of said first part to said second part in the dividing of step a) ranges from 0.1 to 10.

10. The method of claim 1, wherein the heavy metals contained in the sludge include copper, iron, tin, zinc, nickel, and chromium.

11. A method for recovering heavy metals from waste-sludge, comprising the actions of:
   a) dividing a waste-sludge into a first part and a second part III a weight ratio determined by metal contents of the waste-sludge;
   b) mixing acid into said first part to a specified pH which sufficiently dissolves heavy metals in the first part, and if the sludge contains ferrous compound, adding sufficient amount of oxidant into the acidified first part whereby ferrous compound is converted into ferric compound;
   c) mixing water into said second part and producing a sufficient slurry for said second part, if the sludge contains ferrous compound, adding sufficient amount of oxidant into the slurry whereby ferrous compound is converted into ferric compound;
   d) slowly adding said second part into said first part of step b) and adjusting pH to reach a specified pH with a simultaneous ultrasonic treatment of sufficient intensity and frequency;
   e) separating the soluble phase from the solid precipitation of the mixture produced by step d);
   f) slowly adding acid into the solid phase of step e), adjusting pH to reach a specified pH and simultaneously applying ultrasonic wave with sufficient intensity and frequency; and
   g) separating the soluble phase from the solid precipitation of the mixture produced by step f).

12. The method of claim 11, wherein the pH in the action of step b) is under 1.5.

13. The method of claim 11, wherein the pH in the action of step b) is above 3.

14. The method of claim 11, wherein the action of step c) includes blowing air into the slurry while stirring.

15. The method of claim 11, wherein the intensity of the ultrasonic treatment in step d) is about 10-100 km/m$^3$, and the frequency is about 20-100 kHz.

16. The method of claim 11, further includes repeating steps a) to e) with the solid phase of step e).

17. The method of claim 11, wherein the acid in step b) is replaced with alkaline.

18. The method of claim 11, wherein the weight ratio of said first part to said second part in the dividing of step a) ranges from 0.1 to 10.

19. The method of claim 11, wherein the heavy metals contained in the sludge include copper, iron, tin, zinc, nickel, and chromium.

20. The method of claim 11, wherein the step c) produces a slurry containing up to about 90% water by weight.

* * * * *